United States Patent
Farid

(10) Patent No.: US 12,468,275 B2
(45) Date of Patent: Nov. 11, 2025

(54) SYSTEMS AND METHODS FOR DISPATCHING ELECTRIC POWER SYSTEM RESOURCES

(71) Applicant: Amro M Farid, Lyme, NH (US)

(72) Inventor: Amro M Farid, Lyme, NH (US)

(73) Assignee: Engineering Systems Analytics, LLC, Mansfield, CT (US)

( * ) Notice: Subject to any disclaimer, the term of this patent is extended or adjusted under 35 U.S.C. 154(b) by 420 days.

(21) Appl. No.: 18/089,481

(22) Filed: Dec. 27, 2022

(65) Prior Publication Data

US 2024/0053714 A1 Feb. 15, 2024

Related U.S. Application Data

(60) Provisional application No. 63/398,139, filed on Aug. 15, 2022.

(51) Int. Cl.
 *G05B 19/042* (2006.01)
 *H02J 3/38* (2006.01)

(52) U.S. Cl.
 CPC .... *G05B 19/042* (2013.01); *G05B 2219/2639* (2013.01); *H02J 3/381* (2013.01)

(58) Field of Classification Search
 CPC ........... G05B 19/042; G05B 2219/2639; H02J 3/381; H02J 2203/20; G06F 16/31; G06F 40/106; G06F 40/186; G06F 40/263; G06F 40/56; G06F 40/58
 USPC ........................................................ 700/295
 See application file for complete search history.

(56) References Cited

U.S. PATENT DOCUMENTS

| | | | | |
|---|---|---|---|---|
| 2012/0179301 A1* | 7/2012 | Aivaliotis | ................. | H02J 3/00 700/286 |
| 2013/0346011 A1* | 12/2013 | Ou | ........................... | H02J 3/06 702/123 |
| 2016/0048150 A1* | 2/2016 | Chiang | ..................... | G05F 1/66 700/295 |
| 2017/0177016 A1* | 6/2017 | Chiang | ..................... | G05F 1/66 |
| 2020/0209291 A1* | 7/2020 | Venkatesh | ............ | G01R 21/003 |

* cited by examiner

*Primary Examiner* — Chun Cao
(74) *Attorney, Agent, or Firm* — Dunlap Bennett & Ludwig, PLLC

(57) ABSTRACT

An automated control system includes at least one memory storing instructions. The automated control system includes at least one processor being configured to execute the instructions to perform operations. The operations include automatically determining the following in a steady-state current injection model: current withdrawal phase angles, power factor constraints, demand bus voltage magnitude constraints, generator voltage magnitude constraints, network flow constraints, generator capacity constraints, thermal line flow constraints, minimum and maximum demand bus voltage phase angle differences, minimum and maximum generator voltage phase angle differences, nodal voltage phase angle vectors, voltage stability constraints, a reference voltage constraint, linear marginal cost curves, linear marginal revenue curves, and retail rates. The operations include automatically minimizing a profit objective function through employment of a Lagrangian function, KKT conditions, and a Newton-Raphson algorithm. The operations include automatically determining setpoints for a plurality of electric power system resources.

16 Claims, 10 Drawing Sheets

$$\min \quad \mathcal{J} = \sum_{g \in \mathcal{G}} \left( \alpha_{Zg}(\mathcal{I}_{Rg}^2 + \mathcal{I}_{Ig}^2)^2 + \beta_{Zg}(\mathcal{I}_{Rg}^2 + \mathcal{I}_{Ig}^2) + \gamma_{Rg} + \gamma_{Ig} \right) +$$

$$\sum_{d \in \mathcal{D}} \left( \bar{\rho}_{Rd}(V_{Rd}I_{Rd} + V_{Id}I_{Id})^2 - \beta_{Rd}(V_{Rd}I_{Rd} + V_{Id}I_{Id}) + \bar{\gamma}_{Rd} \right)$$

$$+ \left( \bar{\rho}_{Id}(-V_{Rd}I_{Id} + V_{Id}I_{Rd})^2 - \beta_{Id}(-V_{Rd}I_{Id} + V_{Id}I_{Rd}) + \bar{\gamma}_{Id} \right)$$

where $\alpha_{Zg} = (\alpha_{Rg}R_g^2 + \alpha_{Ig}X_g^2)/2$, and $\beta_{Zg} = (\beta_{Rg}R_g + \beta_{Ig}X_g)$.

$\bar{\rho}_d = -\rho_d/2$, and $\bar{\gamma}_d = -\gamma_d$

800 —

FIG. 8A $$\begin{bmatrix} \mathcal{I}_{GR} \\ -\mathcal{I}_{DR} \end{bmatrix} - \begin{bmatrix} A_G^T \\ A_D^T \end{bmatrix} \mathcal{I}_{LR}$$

$$\begin{bmatrix} \mathcal{I}_{GI} \\ -\mathcal{I}_{DI} \end{bmatrix} - \begin{bmatrix} A_G^T \\ A_D^T \end{bmatrix} \mathcal{I}_{LI}$$

$$A_G(l,g) = \begin{cases} 1 & \text{if line } l \text{ originates at generator } g \\ -1 & \text{if line } l \text{ terminates at generator } g \\ 0 & \text{otherwise} \end{cases}$$

$$A_D(l,d) = \begin{cases} 1 & \text{if line } l \text{ originates at demand bus } d \\ -1 & \text{if line } l \text{ terminates at demand bus } d \\ 0 & \text{otherwise} \end{cases}$$

801 —

FIG. 8B $$\begin{bmatrix} A_G^T \\ A_D^T \end{bmatrix} \mathcal{I}_{LR} - G \begin{bmatrix} V_{GR} \\ V_{DR} \end{bmatrix} + B \begin{bmatrix} V_{GI} \\ V_{DI} \end{bmatrix}$$

$$\begin{bmatrix} A_G^T \\ A_D^T \end{bmatrix} \mathcal{I}_{LI} - B \begin{bmatrix} V_{GR} \\ V_{DR} \end{bmatrix} - G \begin{bmatrix} V_{GI} \\ V_{DI} \end{bmatrix}$$

$G = [A_G \ A_D]^T G_L [A_G \ A_D]$
$B = [A_G \ A_D]^T B_L [A_G \ A_D]$

802 —

FIG. 8C $900 \longrightarrow V_{I_{ref}}$

FIG. 9A $$901 \longrightarrow \begin{aligned} & I_{GR} - I_{GR}^{max} \\ & I_{GR}^{min} - I_{GR} \\ & I_{GI} - I_{GI}^{max} \\ & I_{GI}^{min} - I_{GI} \end{aligned}$$

FIG. 9B $902 \longrightarrow I_{LR}^2 + I_{LI}^2 - |\overline{I_L}|^2$

FIG. 9C $903 \longrightarrow V_{DR}^2 + V_{DI}^2 - |\overline{V_D}|^2$

FIG. 9D $904 \longrightarrow V_{GR}^2 + V_{GI}^2 - |\overline{V_G}|^2$ $$905 \longrightarrow \begin{aligned} & V_{DI} - V_{DR}\tan(\theta_{VD}^{max}) \\ & V_{DR}\tan(\theta_{VD}^{min}) - V_{DI} \end{aligned}$$

FIG. 9E $$906 \longrightarrow \begin{aligned} & I_{LI} - I_{LR}\tan(\theta_L^{max}) \\ & I_{LR}\tan(\theta_L^{min}) - I_{LI} \end{aligned}$$

where $\theta_L^{min} = \Delta\theta_{BV}^{min} - \theta_{ZL}$ and $\theta_L^{max} = \Delta\theta_{VGD}^{max} - \theta_{ZL}$

FIG. 9F $907 \longrightarrow (V_{DR} - \Upsilon_{VDR}) - m_{VD}(V_{DI} - \Upsilon_{VDI})$ where $-V_{DR}^2 - V_{DI}^2 + |\overline{V_D}|^2 \le 0$

FIG. 9G

Data: $k = 0, y_0, \epsilon$
Result: $y^*$
while $\|\nabla \mathcal{L}(y_k)\| < \epsilon$ do
$\quad y_{k+1} \leftarrow y_k + H_k^{-1} \nabla \mathcal{L}(y_k)$
$\quad k \leftarrow k + 1;$
end
$y^\dagger \leftarrow y_k$
if $y^\dagger \in \mathcal{R}_\mathcal{F}$ then
$\quad y^* \leftarrow y_k$
else
$\quad y^* \in \emptyset,$
end
$y^* \leftarrow y_k$ where $x = [V_{RG}; V_{IG}; I_{RG}; I_{IG}; V_{RD}; V_{ID}].$

FIG. 10

SYSTEMS AND METHODS FOR DISPATCHING ELECTRIC POWER SYSTEM RESOURCES

CROSS-REFERENCE TO RELATED APPLICATIONS

This application claims the benefit of U.S. Provisional Application No. 63/398,139, filed Aug. 15, 2022, which is hereby incorporated by reference in its entirety.

BACKGROUND

Electric power grids continue to grow in complexity with additional operators, demands, and resources, which may include but are not limited to, distributed power generation, traditional power generation, renewable power generation, virtual power generation, microgrids, energy storage, and power distribution. It is desirable to have reliable power systems. It is also desirable to meet the demands on power systems while minimizing the resources required to meet the demands.

Many conventional systems and methods have attempted to optimize power flow and/or load flow in electrical power systems. One of the goals of such systems and methods is to minimize cost for each kilowatt hour of power delivered. Many of these systems and methods rely on power-flow models to analyze electrical power systems. Such models may take into consideration aspects of electrical power systems and distribution, which may include but are not limited to, network flows, generator capacity constraints, line capacity constraints, and bus voltage constraints. Due to the complexity of electrical power grids, such models are too complex to be calculated by hand. Some of this complexity is due to the fact that power flow into load impedances are based on the square of applied voltages and are thus non-linear. Additional complexity is due to the non-convex constraints of power flows in electrical power systems.

Once such power-flow model is the Alternating Current Optimal Power Flow (ACOPF) model. An ACOPF model may provide a non-linear system of equations. An ACOPF model may be used to describe the energy flow through each transmission line in an electrical power grid. An ACOPF model may assume inelastic demand for electric power.

Another such power-flow model is Direct Current Optimal Power Flow (DCOPF). A DCOPF model may provide a linear system of equations. DCOPF models may be based on active power flows. DCOPF models may neglect reactive power flows. DCOPF models may be less accurate than ACOPF models. DCOPF models may not provide reliable results in distribution systems where line loses are non-negligible. DCOPF models may not satisfy nonlinear power flow equations.

Problems may arise in conventional approaches and devices when relaxations and approximations of calculation inputs yields suboptimal solutions and/or degraded reliability. Suboptimal solutions may result in unnecessary operating costs. Degraded reliability may be addressed with active control systems which may add complexity and/or costs to electrical power systems.

Accordingly, given the shortcomings of conventional systems and methods, a need exists for unconventional systems and methods that more effectively manage power flow of electrical power systems, and manage operation of electrical power systems more cost-efficiently.

This Background is provided to introduce a brief context for the Detailed Description that follows. This Background is not intended to be an aid in determining the scope of the claimed subject matter nor be viewed as limiting the claimed subject matter to implementations that solve any or all of the shortcomings or problems presented above.

SUMMARY

The disclosed embodiments provide unconventional systems and methods for dispatching power system resources. Power system resources may be dispatched through employment of one or more setpoints.

The disclosed embodiments may be employed to manage power system resources in electrical power systems more reliably than conventional methods.

The disclosed embodiments may be employed to manage power system resources in electrical power systems more efficiently than conventional methods.

The disclosed embodiments may be employed to manage operation of electrical power systems more cost-effectively than conventional systems.

Embodiments consistent with the present disclosure are rooted in computer technology and may include automated control systems. An automated control system may be employed to manage power system resources in electrical power systems more effectively than conventional systems. For example, an automated control system may be configured to determine power system resource setpoints. An automated control system may be configured to automatically dispatch power system resources. An automated control system may be configured to automatically control power system resources. Managing power system resources more effectively than conventional systems may improve reliability in electrical power systems.

Consistent with the present embodiments, an automated control system may comprise at least one memory. The at least one memory may be configured to store instructions. The automated control system may comprise at least one processor. The at least one processor may be configured to execute the instructions to perform operations. The operations may comprise automatically minimizing a profit objective function. The profit objective function may be minimized through employment of a Lagrangian function. The profit objective function may be minimized through employment of Karush-Kuhn-Tucker (KKT) conditions. The profit objective function may be minimized through employment of a Newton-Raphson algorithm. The profit objective function may be based on a demand bus voltage vector for one or more demand buses. The one or more demand buses may be part of a steady-state current injection model. The profit objective function may be based on a current withdrawal from one or more of the demand buses. The profit objective function may be based on a current injection from one or more generators. The one or more generators may be part of the steady-state current injection model. The profit objective function may be based on one or more generator capacity constraints for one or more of the generators. The profit objective function may be based on a linear marginal cost curve for one or more of the generators. The profit objective function may be based on a linear marginal revenue curve for one or more of the demand buses. The profit objective function may be based on a retail rate for one or more lead lines. The one or more lead lines may be part of the steady-state current injection model. The profit objective function may be based on a retail rate for one or more power lines. The one or more power lines may be part of the steady-state current injection model. The profit objective function may be based on a complex power loss in one or more of the lead lines.

Consistent with the present embodiments, operations may comprise automatically determining setpoints for one or more electric power system resources. The setpoints may be based on a minimum output of a profit objective function. The setpoints may be based on a generator voltage vector for one or more generators. The one or more generators may be part of a steady-state current injection model. The setpoints may be based on one or more power factor constraints for one or more demand busses. The one or more demand buses may be part of the steady-state current injection model. The setpoints may be based on one or more demand bus voltage magnitude constraints for one or more of the demand buses. The setpoints may be based on one or more generator voltage magnitude constraints for one or more of the generators. The setpoints may be based on one or more network flow constraints. The setpoints may be based on one or more thermal line flow constraints. The setpoints may be based on one or more voltage stability constraints for one or more lead lines. The one or more lead lines may be part of the steady-state current injection model. The setpoints may be based on one or more voltage stability constraints for one or more power lines. The one or more power lines may be part of the steady-state current injection model. The setpoints may be based on a reference voltage constraint.

Consistent with the present embodiments, a method for determining setpoints for one or more electric power system resources is disclosed. The method may comprise minimizing a profit objective function. The profit objective function may be minimized through employment of a Lagrangian function. The profit objective function may be minimized through employment of Karush-Kuhn-Tucker (KKT) conditions. The profit objective function may be minimized through employment of a Newton-Raphson algorithm. The profit objective function may be based on a demand bus voltage vector for one or more demand buses. The one or more demand buses may be part of a steady-state current injection model. The profit objective function may be based on a current withdrawal from one or more of the demand buses. The profit objective function may be based on a current injection from one or more generators. The one or more generators may be part of the steady-state current injection model. The profit objective function may be based on one or more generator capacity constraints for one or more of the generators. The profit objective function may be based on a linear marginal cost curve for one or more of the generators. The profit objective function may be based on a linear marginal revenue curve for one or more of the demand buses. The profit objective function may be based on a retail rate for one or more lead lines. The one or more lead lines may be part of the steady-state current injection model. The profit objective function may be based on a retail rate for one or more power lines. The one or more power lines may be part of the steady-state current injection model. The profit objective function may be based on a complex power loss in one or more of the lead lines.

Consistent with the present embodiments, a method may comprise determining setpoints for one or more electric power system resources. The setpoints may be based on a minimum output of a profit objective function. The setpoints may be based on a generator voltage vector for one or more generators. The one or more generators may be part of a steady-state current injection model. The setpoints may be based on one or more power factor constraints for one or more demand busses. The one or more demand buses may be part of the steady-state current injection model. The setpoints may be based on one or more demand bus voltage magnitude constraints for one or more of the demand buses. The setpoints may be based on one or more generator voltage magnitude constraints for one or more of the generators. The setpoints may be based on one or more network flow constraints. The setpoints may be based on one or more thermal line flow constraints. The setpoints may be based on one or more voltage stability constraints for one or more lead lines. The one or more lead lines may be part of the steady-state current injection model. The setpoints may be based on one or more voltage stability constraints for one or more power lines. The one or more power lines may be part of the steady-state current injection model. The setpoints may be based on a reference voltage constraint.

The disclosed systems and methods may be implemented using a combination of conventional hardware and software as well as specialized hardware and software, such as one or more machines constructed and/or programmed specifically for performing functions associated with the disclosed operations or method aspects. The foregoing general description and the following detailed description disclose example embodiments which are explanatory only and are not restrictive of the claims.

BRIEF DESCRIPTION OF THE SEVERAL VIEWS OF THE DRAWINGS

The accompanying drawings, which are incorporated in and constitute a part of this specification, illustrate several embodiments and, together with the description, serve to explain the disclosed principles. In the drawings:

FIG. 8A illustrates an example equation for an example profit objective function, as employed in various embodiments.

FIG. 8B illustrates example equation for example network flow constraints for generators and demand buses, as employed in various embodiments.

FIG. 8C illustrates example equations for example network flow constraints for lead lines and power lines, as employed in various embodiments.

FIG. 9A illustrates an example expression of an example reference voltage constraint, as employed in various embodiments.

FIG. 9B illustrates example equations for example generator capacity constraints, as employed in various embodiments.

FIG. 9C illustrates an example equation for example thermal line flow constraints, as employed in various embodiments.

FIG. 9D illustrates example equations for example voltage magnitude constraints, as employed in various embodiments.

FIG. 9E illustrates example equations for example power factor constraints, as employed in various embodiments.

FIG. 9F illustrates example equations for an example voltage stability constraint, as employed in various embodiments.

FIG. 9G illustrates an example equation for an example relaxation of an example lower bound for an example voltage magnitude constraint, as employed in various embodiments.

FIG. 10 illustrates an example Newton-Raphson algorithm, as employed in various embodiments.

DETAILED DESCRIPTION OF EMBODIMENTS

Figure 1:
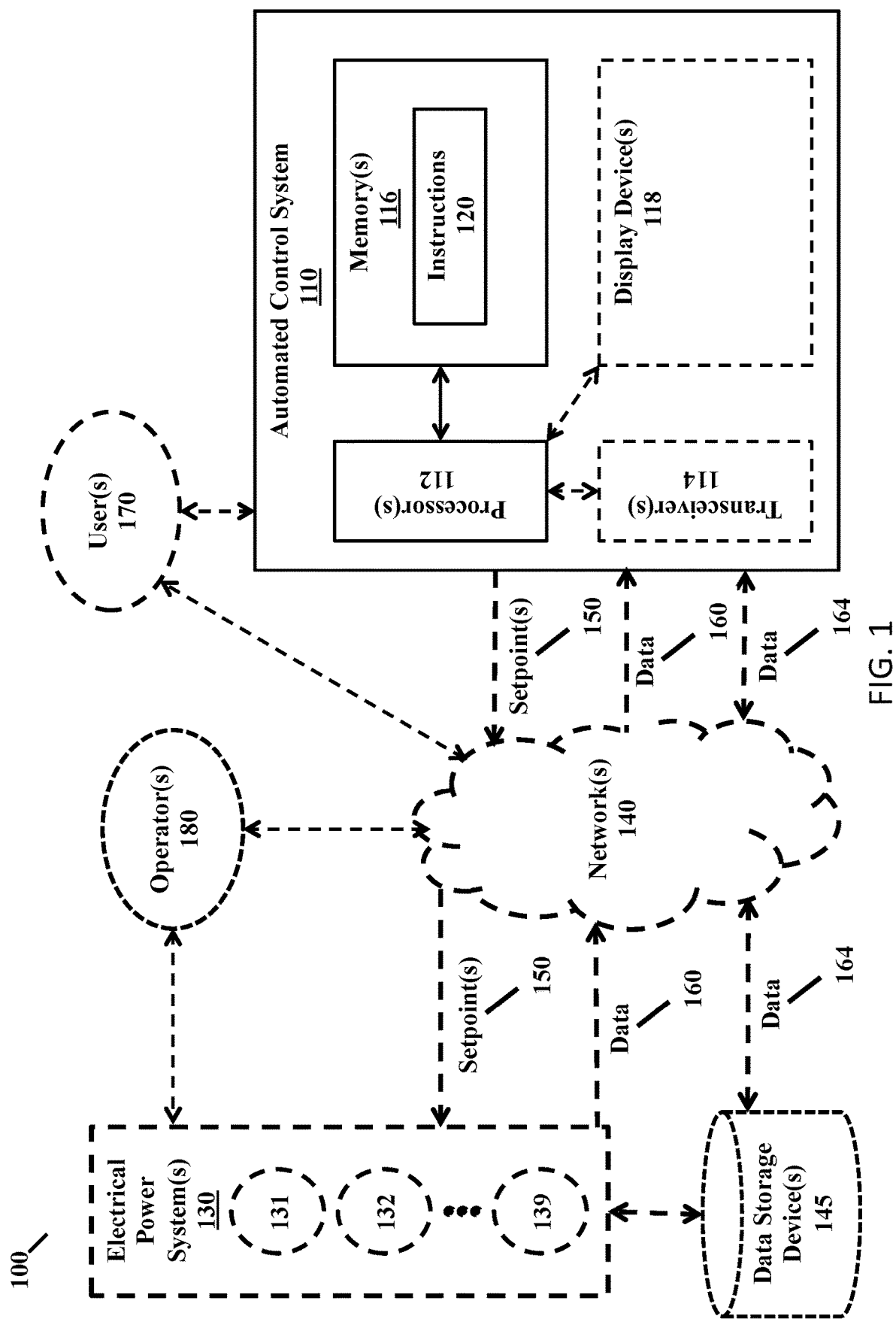
FIG. 1 is a block diagram of an example automated control network, consistent with disclosed embodiments.

Consistent with disclosed embodiments, systems and methods for dispatching power system resources are disclosed. As explained above, disclosed systems and methods may provide improvements in reliability, efficiency, and/or cost-effectiveness over conventional approaches to electrical power system management.

As used herein, a power system resource may comprise, for example, at least one of the following: a generator, a battery, virtual power generation, renewable power generation, and/or other power generation or power storage systems or devices.

As used herein, a convex function may refer to a function that is shaped like a cup when graphed. A convex function on an open set has no more than one minimum.

As used herein, a complex number may refer to an element of a number system that comprises a real component (also referred to as a real number), and an imaginary component (also referred to as an imaginary number).

As used herein, an imaginary number may refer to a number when squared results in a negative number. An imaginary component may be the imaginary part of something complex. Examples include complex numbers, complex planes, complex functions, impedance, complex signals, and other mathematical expressions and systems involving imaginary components.

As used herein, complex power may refer to a representation of electrical power that comprises an active power component and a reactive power component. The active power may be represented by the real component of the complex power. The reactive power may be represented by the imaginary component of the complex power.

As used herein, a setpoint may refer to a desired value of a setting in a control system, the control system being configured to control one or more electrical power system components.

As used herein, a process variable may refer to a current measured value of a particular device or process in a control system.

As used herein, a constraint may refer to a condition of an optimization problem that should be satisfied by a solution.

As used herein, a steady-state current injection model may refer to a representation of one or more interconnected electrical power systems. The steady-state current injection model may be based on a topology of the one or more interconnected electrical power systems. A physical power grid may comprise the one or more interconnected electrical power systems. Electrical power systems may comprise, for example, medium-to-high voltage transmission systems, medium-to-low distribution systems, microgrids, and/or other electrical power transmission and distribution systems.

As used herein, a profit objective function may be negative. The profit objective function may be minimized. By minimizing the profit objective function, a maximum profit may be achieved. This may accomplish the same as a profit maximization objective function.

Embodiments consistent with the present disclosure may include an automated control system. An automated control system may be configured to automatically minimize a profit objective function. The automated control system may be configured to maximize profit in one or more interconnected electrical power systems. The automated control system may be configured to minimize costs in one or more interconnected electrical power systems. The automated control system may be configured to perform operations. The automated control system may be configured to perform operations automatically. The operations may be configured to make determinations and/or calculations. The operations may be configured to automatically determine one or more setpoints for one or more power system resources. One or more of the setpoints may comprise a complex power setpoint.

Embodiments consistent with the present disclosure may include a profit objective function. The profit objective function may be convex. The profit objective function may be separable with respect to generators and demand buses. The profit objective function may be quartic in lead line currents. The profit objective function may be quadratic in demand bus voltages.

In some embodiments, determinations may be based on a Current-Voltage Alternating Current Optimal Power Flow (IV-ACOPF) model. The IV-ACOPF model may view generators as current sources. The IV-ACOPF model may be employed to minimize cost of generator current injections. The IV-ACOPF model may avoid non-convexity. The determinations may be based on real and imaginary components of generator currents. The determinations may be based on real and imaginary components of line currents. The determinations may be based on real and imaginary components of generator voltages. The determinations may be based on real and imaginary components of bus voltages. The determinations may be configured to avoid active and reactive power variables.

In some embodiments, determinations may be based on a steady-state current-injection model of one or more interconnected electrical power systems. The steady-state current-injection model may connect terminal voltage of one or more generators to exactly one bus through a lead line. The steady-state current-injection model may separate one or more power system nodes into one of two groups: generator terminals and demand-buses. Power injection into a given bus may comprise a minimum power factor limit. Power injection into a given bus may comprise a maximum power factor limit.

Embodiments consistent with the present disclosure may include determining a current withdrawal phase angle for one or more demand buses. The demand buses may be part of a steady-state current injection model. The current withdrawal phase angle may be based on a current withdrawal for each of the demand busses.

Embodiments consistent with the present disclosure may include determining a power factor constraint for one or more demand buses. The demand buses may be part of a steady-state current injection model. The power factor constraint may be based on a demand bus voltage phase angle.

The power factor constraint may be based on a current withdrawal phase angle. The power factor constraint may be based on a reference bus. The reference bus may be a demand bus connected to a lead line. The power factor constraint may be employed to advance reliability in one or more power system resources in one or more electrical power systems.

Embodiments consistent with the present disclosure may include determining a set of demand bus voltage magnitude constraints for one or more demand buses. The demand buses may be part of a steady-state current injection model. Each set of demand bus voltage magnitude constraints may be based on a demand bus voltage vector. Each set of demand bus voltage magnitude constraints may be based on a demand bus voltage phase angle. Each set of demand bus voltage magnitude constraints may be based on a power factor constraint.

Embodiments consistent with the present disclosure may include determining a set of generator voltage magnitude constraints for one or more generators. The generators may be part of a steady-state current injection model. Each set of generator voltage magnitude constraints may be based on a generator voltage vector.

Embodiments consistent with the present disclosure may include determining one or more network flow constraints. The network flow constraints may be applied to a steady-state current injection model. The network flow constraints may be based on a current withdrawal from one or more demand busses. The network flow constraints may be based on a current injection from one or more generators. The generators may be part of the steady-state current injection model. The network flow constraints may be based on a current vector for one or more power lines. The power lines may be part of the steady-state current injection model Embodiments consistent with the present disclosure may include determining a set of generator capacity constraints for one or more generators. The generators may be part of a steady-state current injection model. A set of generator capacity constraints may be based on a maximum stator current. A set of generator capacity constraints may be based on a maximum rotor current. A set of generator capacity constraints may be based on a minimum safe operating level. A set of generator capacity constraints may be based on a generator impedance.

Embodiments consistent with the present disclosure may include partitioning a power line from each of one or more generators as a lead line. The power line may be part of a steady-state current injection model. The generators may be part of the steady-state current injection model.

Embodiments consistent with the present disclosure may include determining thermal line flow constraints. The thermal line flow constraints may be based on a power line impedance vector for one or more power lines. The power lines may be part of a steady-state current injection model.

Embodiments consistent with the present disclosure may include determining a minimum demand bus voltage phase angle difference between connected demand buses. The connected demand buses may be part of a steady-state current injection model. The minimum demand bus voltage phase angle difference may be based on a demand bus voltage phase angle for each of the connected demand buses.

Embodiments consistent with the present disclosure may include determining a maximum demand bus voltage phase angle difference between connected demand buses. The connected demand buses may be part of a steady-state current injection model. The maximum demand bus voltage phase angle difference may be based on a demand bus voltage phase angle for each of the connected demand buses.

Embodiments consistent with the present disclosure may include determining a minimum generator voltage phase angle difference between two or more generators. The generators may be part of a steady-state current injection model. The minimum generator voltage phase angle difference may be based on a generator voltage phase angle for each of the generators.

Embodiments consistent with the present disclosure may include determining a maximum generator voltage phase angle difference between two or more generators. The generators may be part of a steady-state current injection model. The maximum generator voltage phase angle difference may be based on a generator voltage phase angle for each of the generators.

Embodiments consistent with the present disclosure may include determining nodal voltage phase angle vectors between one or more generators and one or more demand buses. The generators and the demand buses may be part of a steady-state current injection model. Each of the nodal voltage phase angle vectors may be based on a demand bus voltage phase angle. Each of the nodal voltage phase angle vectors may be based on a generator voltage phase angle.

Embodiments consistent with the present disclosure may include determining one or more voltage stability constraints for one or more lead lines and/or power lines. The lead lines and/or power lines may be part of a steady-state current injection model. A voltage stability constraint may be based on a difference in voltage phase angle between a generator and a connected bus. The voltage stability constraints may be based on a difference in voltage phase angle between two connected buses. The voltage stability constraints may be based on a minimum voltage phase angle difference between the nodes at either end of a lead line and/or power line. The voltage stability constraints may be based on a maximum phase angle difference between the nodes at either end of a lead line and/or power line. A node may comprise a generator. A node may comprise a demand bus. Voltage stability constraints may be employed to advance reliability in one or more power system resources in one or more electrical power systems.

Embodiments consistent with the present disclosure may include determining a reference voltage constraint for a steady-state current injection model. The reference voltage constraint may be based on a reference voltage angle.

Embodiments consistent with the present disclosure may include determining a linear marginal cost curve for one or more generators. The generators may be part of a steady-state current injection model. The linear marginal cost curve may be based on a generator voltage vector. The linear marginal cost curve may be based on a current injection. The linear marginal cost curve may be based on generator cost terms of an active and reactive power injection.

In some embodiments, generator cost terms may comprise quadratic cost terms. The generator cost terms may comprise linear cost terms. The generator cost terms may comprise fixed cost terms. The generator cost terms may comprise costs for active and reactive power generation.

Embodiments consistent with the present disclosure may include determining a linear marginal revenue curve for one or more demand buses. The demand buses may be part of a steady-state current injection model. The linear marginal revenue curve may be based on a demand bus voltage vector. The linear marginal revenue curve may be based on a current withdrawal. The linear marginal revenue curve may be based on demand bus revenue terms of an active and reactive power withdrawal.

In some embodiments, demand bus revenue terms may comprise quadratic revenue terms. The demand bus revenue terms may comprise linear revenue terms. The demand bus revenue terms may comprise fixed revenue terms. The demand bus revenue terms may comprise revenues for active and reactive power consumption.

Embodiments consistent with the present disclosure may include determining a retail rate for one or more lead lines and/or power lines. The lead lines and/or power lines may be part of a steady-state current injection model.

In some embodiments, determinations may be based on box constraints on generator current capacities. The box constraints may be derived from capability curves of synchronous generators.

In some embodiments, determinations may be based on exogenously fixed demand-bus current withdrawals. Demand-bus voltages may be maintained as decision variables.

Embodiments consistent with the present disclosure may include a Lagrangian function. In the Lagrangian function, $h(\chi)$ may be represented by network flow constraints and/or a reference voltage constraint. In the Lagrangian function, $g(\chi)$ may be represented by any combination of: generator capacity constraints, thermal line flow constraints, voltage magnitude constraints, power factor constraints, a voltage stability constraint, and a relaxation of a lower bound for a voltage magnitude constraint.

The Lagrangian function may be employed to solve an optimization program. The Lagrangian function may be employed to minimize a profit objective function.

Embodiments consistent with the present disclosure may include Karush-Kuhn-Tucker (KKT) conditions. The KKT conditions may be employed to solve an optimization program. The KKT conditions may be employed to minimize a profit objective function.

Embodiments consistent with the present disclosure may include a Newton-Raphson algorithm. The Newton-Raphson algorithm may be employed to solve an optimization program. The Newton-Raphson algorithm may be employed to minimize a profit objective function.

Embodiments consistent with the present disclosure may include receiving data from one or more electrical power systems. The data may be received automatically. The data may include a demand bus voltage vector for one or more demand buses. The data may include a demand bus voltage phase angle for one or more demand buses. The data may include a current withdrawal from one or more demand buses. The data may include a generator voltage vector for one or more generators. The data may include a generator voltage phase angle for one or more generators. The data may include a current injection from one or more generators. The data may include a maximum stator current for one or more generators. The data may include a maximum rotor current for one or more generators. The data may include a minimum safe operating level for one or more generators. The data may include a generator impedance for one or more generators. The data may include a current vector for one or more power lines. The data may include a power line impedance vector for one or more power lines. The data may include a retail rate for one or more lead lines. The data may include a retail rate for one or more power lines. The data may include a reference voltage angle for a steady-state current injection model. The data may include generator cost terms of an active and reactive power injection for one or more generators. The data may include demand bus revenue terms of an active and reactive power withdrawal at one or more demand buses. The data may include a complex power loss in one or more lead lines.

Embodiments consistent with the present disclosure may include retrieving data from one or more data storage devices. The data may be received automatically. The data may include a demand bus voltage vector for one or more demand buses. The data may include a demand bus voltage phase angle for one or more demand buses. The data may include a current withdrawal from one or more demand buses. The data may include a generator voltage vector for one or more generators. The data may include a generator voltage phase angle for one or more generators. The data may include a current injection from one or more generators. The data may include a maximum stator current for one or more generators. The data may include a maximum rotor current for one or more generators. The data may include a minimum safe operating level for one or more generators. The data may include a generator impedance for one or more generators. The data may include a current vector for one or more power lines. The data may include a power line impedance vector for one or more power lines. The data may include a retail rate for one or more lead lines. The data may include a retail rate for one or more power lines. The data may include a reference voltage angle for a steady-state current injection model. The data may include generator cost terms of an active and reactive power injection for one or more generators. The data may include demand bus revenue terms of an active and reactive power withdrawal at one or more demand buses. The data may include a complex power loss in one or more lead lines.

Embodiments consistent with the present disclosure may include communicating setpoints to one or more users of an automated control system. The setpoints may be communicated automatically. For example, the setpoints may be presented on a display device. For example, the setpoints may be communicated to a remote device. For example, the setpoints may be printed on a medium.

Embodiments consistent with the present disclosure may include communicating setpoints to one or more electric power system resources. The setpoints may be communicated automatically. An electric power system resource may be configured to apply a received setpoint to dispatch one or more power system resources. An electric power system resource may be configured to modify an existing setpoint based on a received setpoint.

Embodiments consistent with the present disclosure may include communicating setpoints to one or more operators of one or more electric power system resources. The setpoints may be communicated automatically. For example, the setpoints may be presented on a display device. For example, the setpoints may be communicated to a remote device. For example, the setpoints may be printed on a medium.

In some embodiments, an automated control system may provide system components that are security constrained.

Embodiments consistent with the present disclosure may include a method. The method may include minimizing a profit objective function. The method may include maximizing profit in one or more interconnected electrical power systems. The method may include minimizing costs in one or more interconnected electrical power systems. The method may include performing determinations and/or calculations. Determinations and/or calculations may be performed automatically.

Embodiments consistent with the present disclosure may include a set of demand buses D with associated vector of voltages $V_D=V_{DR}+jV_{DI}$ and current withdrawals $I_D=I_{DR}+jI_{DI}$. The constant $N_D$ may reflect the number of demand buses in the set. $\alpha_{Rd}$, $\beta_{Rd}$, and $\gamma_{Rd}$ may be the quadratic, linear, and fixed terms of active power withdrawals at each demand bus d∈D. $\gamma_{Id}$ is the fixed term of reactive power withdrawal at each demand bus d∈D.

Embodiments consistent with the present disclosure may include a set of generators G with associated vector of voltages $V_G=V_{GR}+jV_{GI}$ and current injections $I_G=I_{GR}+jI_{GI}$. The constant $N_G$ may reflect the number of generators in the set. $\alpha_{Rg}$, $\beta_{Rg}$, and $\gamma_{Rg}$ may be the quadratic, linear, and fixed cost terms of active power injections by each generator g∈G.

Embodiments consistent with the present disclosure may include lead lines $L_G$ and power lines $L_D$. These lines may have their associated vector of currents $I_L=I_{LR}+jI_{LI}=[I_{LG}; I_{LD}]$. The constant $N_L=N_{LG}+N_{LD}$ may reflect the number of lines.

Embodiments consistent with the present disclosure may include retail rates. Complex power coming over a lead line $I_g$ may have an associated retail rate of $\rho_d+\alpha_g$ while a power line may have an associated retail rate of $\rho_d$.

Reference will now be made in detail to example embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the devices, methods, and examples are illustrative only and are not intended to be necessarily limiting.

FIG. 1 is a block diagram of an example automated control network 100, consistent with disclosed embodiments. Automated control network 100 may comprise automated control system 110. Automated control system 110 may comprise one or more processors 112. Automated control system 110 may comprise one or more transceivers 114. Automated control system 110 may comprise one or more memory devices 116. One or more memory devices 116 may comprise instructions 120. Automated control system 110 may comprise one or more display devices 118. Automated control network 100 may comprise one or more electrical power systems 130. One or more electrical power systems 130 may comprise one or more power system resources (131, 132 . . . 139). Automated control network 100 may comprise one or more communication networks 140. Devices in automated control network 100 may be configured to communicate with each other through employment of one or more communication networks 140. Devices in automated control network 100 may be configured to communicate with each other directly. Automated control network 100 may comprise one or more data storage devices 145. One or more users 170 may have access to automated control system 110. One or more operators 180 may have access to one or more power system resources (131, 132 . . . 139). One or more operators 180 may have access to one or more electrical power systems 130. One or more setpoints 150 may be communicated from automated control system 110 to one or more power system resources (131, 132 . . . 139). Data 160 may be received at automated control system 110 from one or more electrical power systems 130. Data 164 may be retrieved from one or more data storage devices 145 by automated control system 110. Data 164 may be communicated to one or more data storage devices 145 from automated control system 110.

Figure 2:
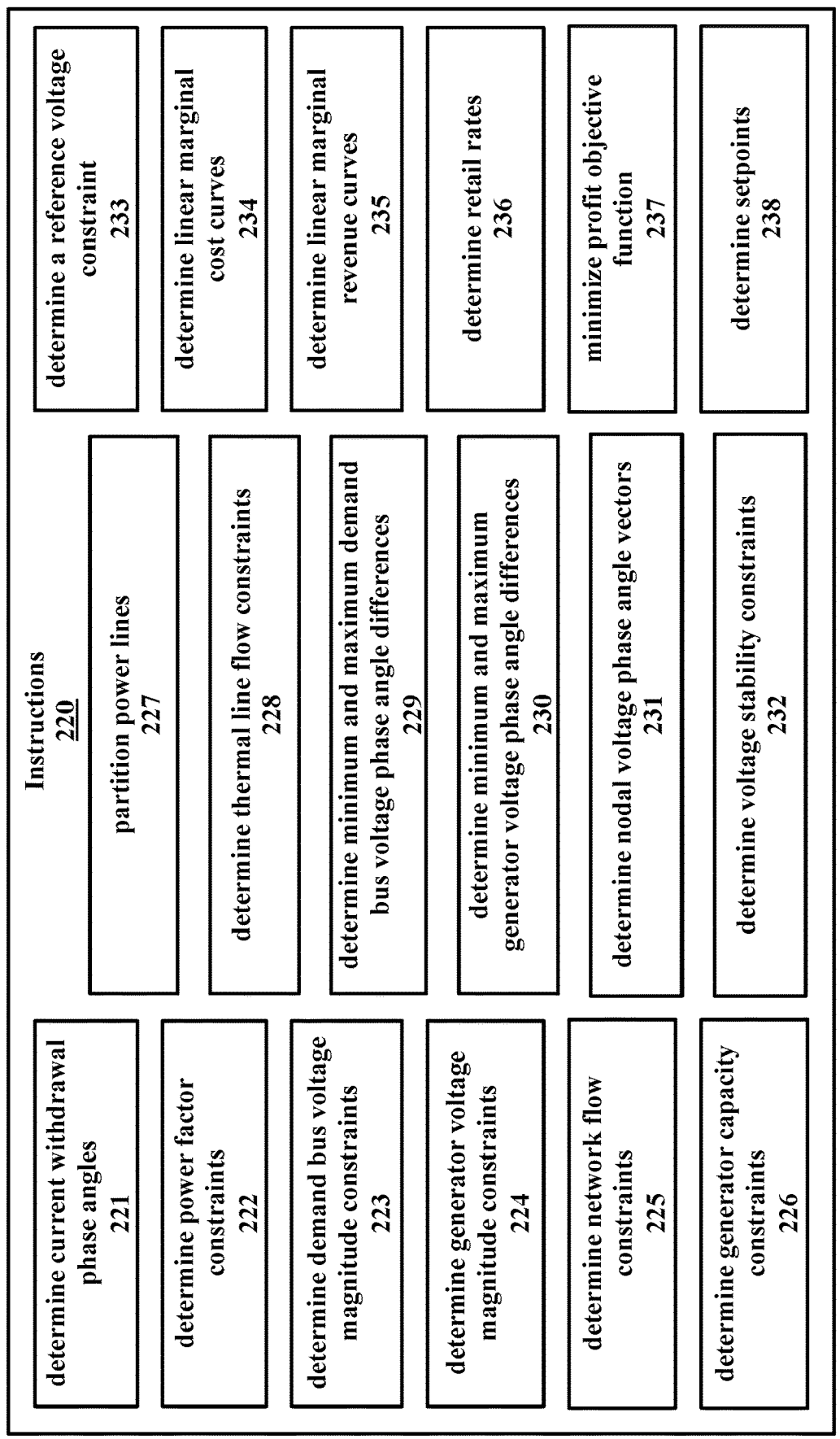
FIG. 2 is a block diagram of first example instructions of an automated control system, consistent with disclosed embodiments.

FIG. 2 is a block diagram of first example instructions 220 of an automated control system, consistent with disclosed embodiments. At least one processor of the automated control system may be configured to execute the instructions 220 to perform operations. The operations may be configured to determine current withdrawal phase angles 221. The operations may be configured to determine power factor constraints 222. The operations may be configured to determine demand bus voltage magnitude constraints 223. The operations may be configured to determine generator voltage magnitude constraints 224. The operations may be configured to determine network flow constraints 225. The operations may be configured to determine generator capacity constraints 226. The operations may be configured to partition power lines 227. The operations may be configured to determine thermal line flow constraints 228. The operations may be configured to determine minimum and maximum demand bus voltage phase angle differences 229. The operations may be configured to determine minimum and maximum generator voltage phase angle differences 230. The operations may be configured to determine nodal voltage phase angle vectors 231. The operations may be configured to determine voltage stability constraints 232. The operations may be configured to determine a reference voltage constraint 233. The operations may be configured to determine linear marginal cost curves 234. The operations may be configured to determine linear marginal revenue curves 235. The operations may be configured to determine retail rates 236. The operations may be configured to minimize profit objective function 237. The operations may be configured to determine setpoints 238.

Figure 3:
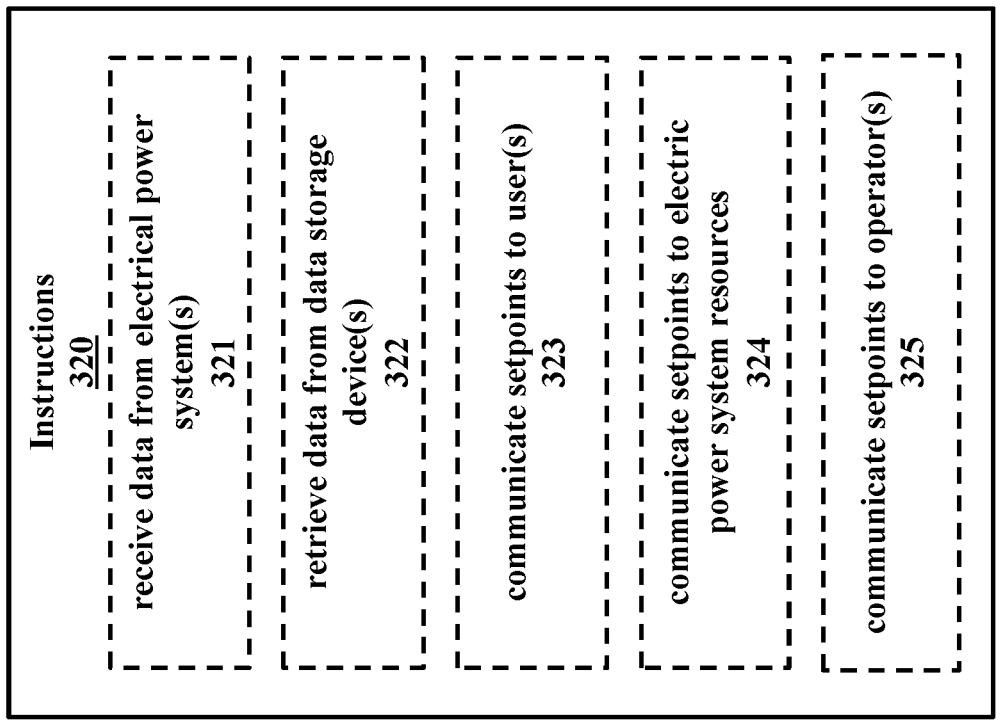
FIG. 3 is a block diagram of second example instructions of an automated control system, consistent with disclosed embodiments.

FIG. 3 is a block diagram of second example instructions 320 of an automated control system, consistent with disclosed embodiments. At least one processor of the automated control system may be configured to execute the instructions 320 to perform operations. The operations may be configured to receive data from one or more electrical power systems 321. The operations may be configured to retrieve data from one or more data storage devices 322. The operations may be configured to communicate setpoints to one or more users 323. The operations may be configured to communicate setpoints to one or more electric power system resources 324. The operations may be configured to communicate setpoints to one or more operators 325

Figure 4:
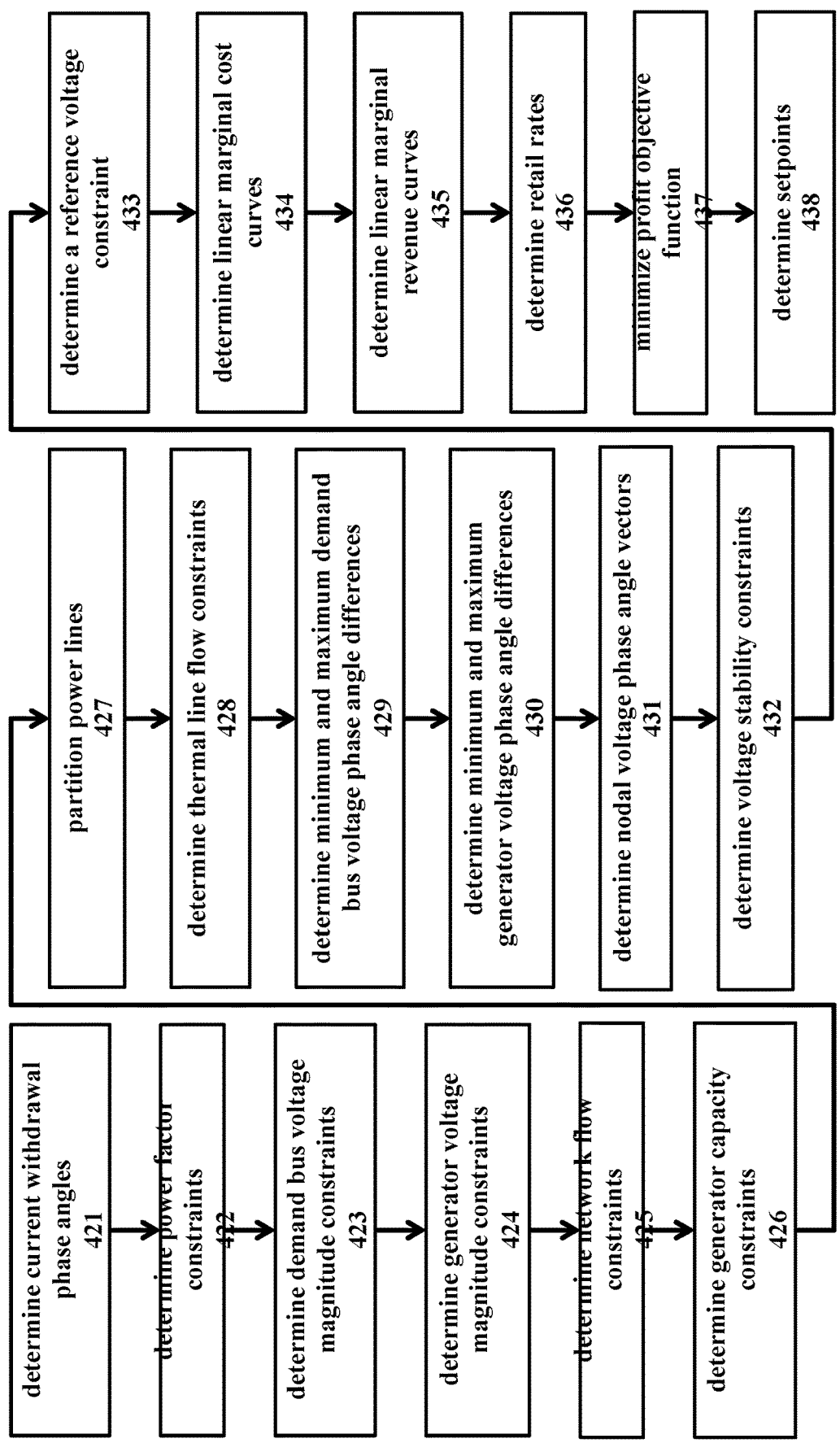
FIG. 4 is a flow diagram of a first example control system process, consistent with disclosed embodiments.

FIG. 4 is a flow diagram of a first example control system process, consistent with disclosed embodiments. Current withdrawal phase angles may be determined at 421. Power factor constraints may be determined at 422. Demand bus voltage magnitude constraints may be determined at 423. Generator voltage magnitude constraints may be determined at 424. Network flow constraints may be determined at 425. Generator capacity constraints may be determined at 426. Power lines may be partitioned at 427. Thermal line flow constraints may be determined at 428. Minimum and maximum demand bus voltage phase angle differences may be determined at 429. Minimum and maximum generator voltage phase angle differences may be determined at 430. Nodal voltage phase angle vectors may be determined at 431. Voltage stability constraints may be determined at 432. A reference voltage constraint may be determined at 433. Linear marginal cost curves may be determined at 434. Linear marginal revenue curves may be determined at 435. Retail rates may be determined at 436. A profit objective function may be minimized at 437. Setpoints may be determined at 438.

Figure 5:
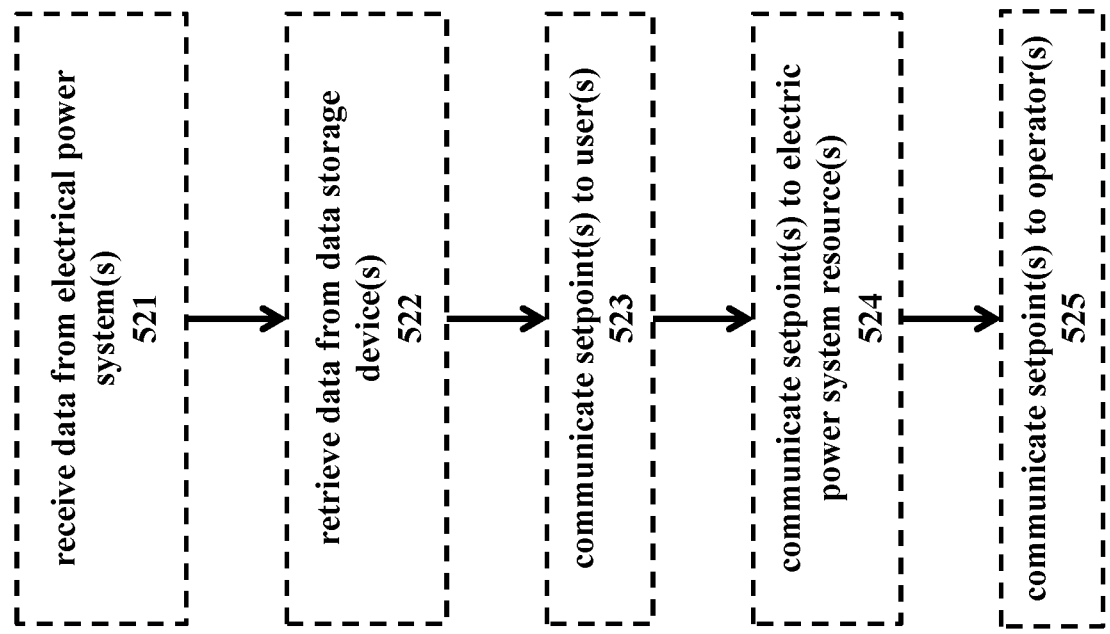
FIG. 5 is a flow diagram of a second example control system process, consistent with disclosed embodiments.

FIG. 5 is a flow diagram of a second example control system process, consistent with disclosed embodiments.

Data from one or more electrical power systems may be received at 521. Data from one or more data storage devices may be retrieved at 522. One or more setpoints may be communicated to one or more users at 523. One or more setpoints may be communicated to one or more electric power system resources at 524. One or more setpoints may be communicated to one or more operators at 525.

Figure 6:
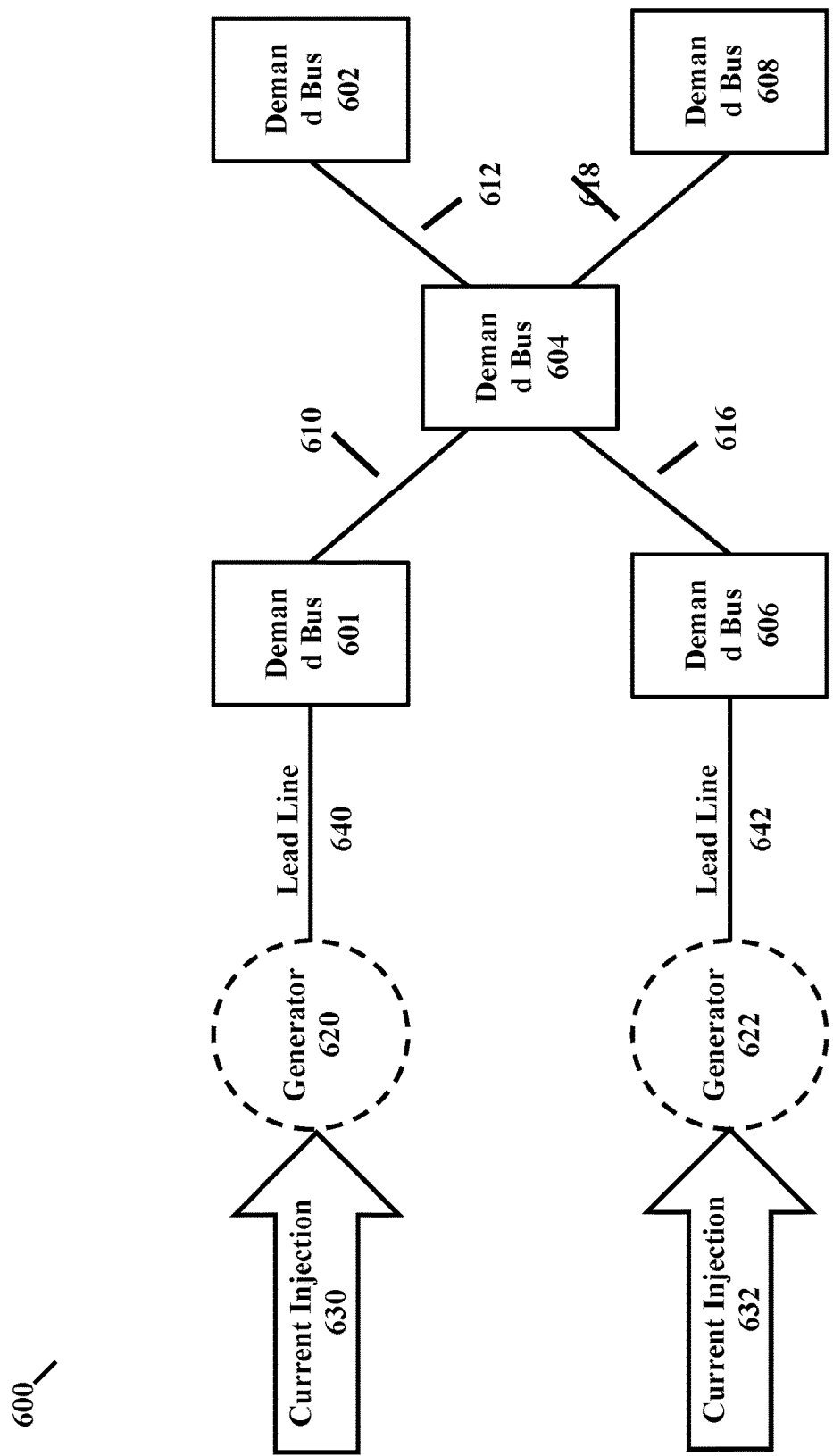
FIG. 6 is a block diagram of first example steady-state current injection model, consistent with disclosed embodiments.

FIG. 6 is a block diagram of first example steady-state current injection model 600, consistent with disclosed embodiments. Steady-state current injection model 600 may comprise one or more demand buses (601, 602, 604, 606, 608). Steady-state current injection model 600 may comprise one or more power lines (610, 612, 616, 618). Two of the demand buses (601, 602, 604, 606, 608) may be connected via one of the power lines (610, 612, 616, 618). Steady-state current injection model 600 may comprise one or more generators (620, 622). Each of the generators (620, 622) may be associated with a current injection (630, 632). Steady-state current injection model 600 may comprise one or more lead lines (640, 642). Each of the lead lines (640, 642) may be attached to one of the generators (620, 622).

Figure 7:
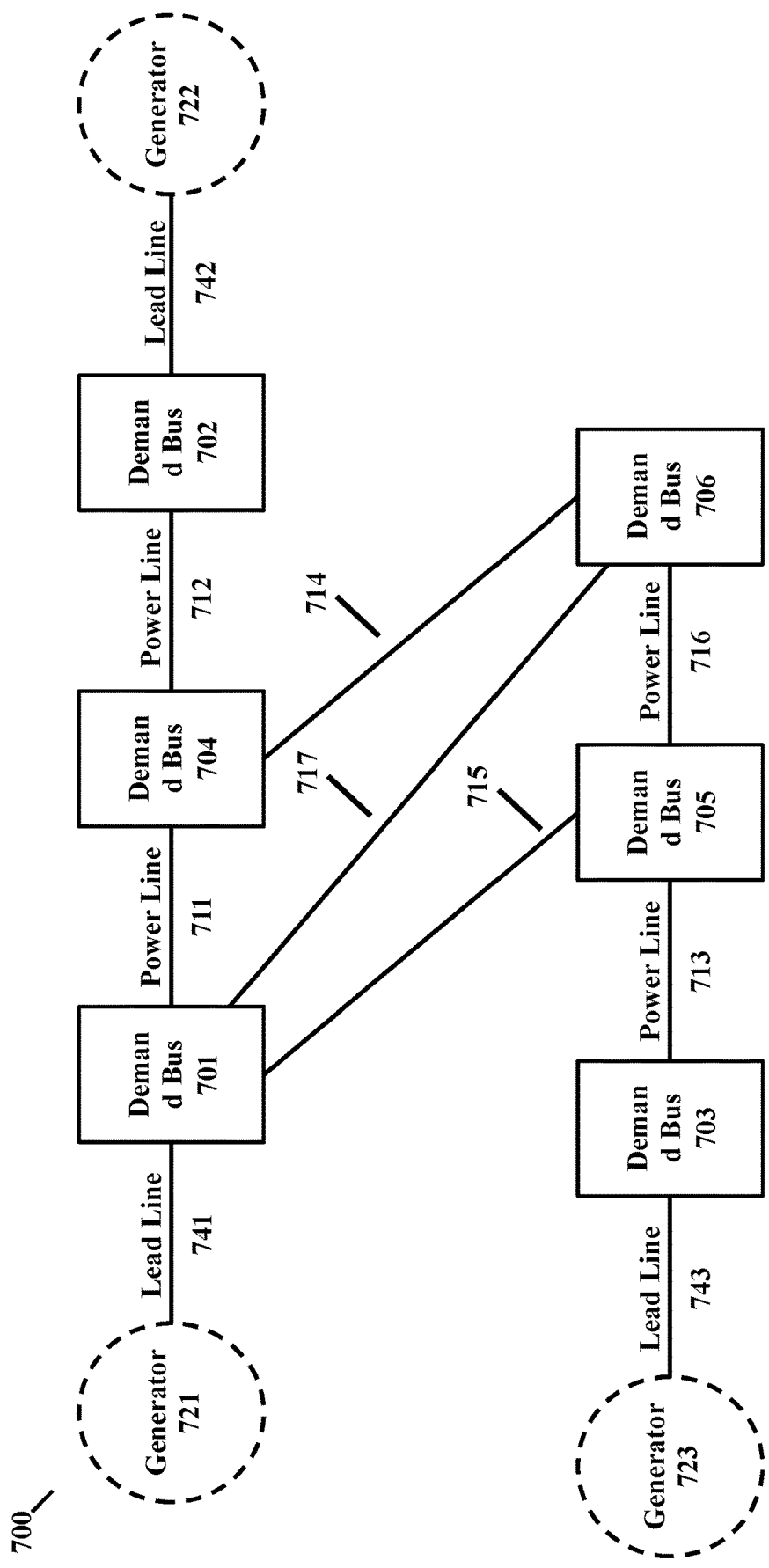
FIG. 7 is a block diagram of second example steady-state current injection model, consistent with disclosed embodiments.

FIG. 7 is a block diagram of second example steady-state current injection model 700, consistent with disclosed embodiments. Steady-state current injection model 700 may comprise one or more demand buses (701, 702, 703, 704, 705, 706). Steady-state current injection model 700 may comprise one or more power lines (711, 712, 713, 714, 715, 716, 717). Two of the demand buses (701, 702, 703, 704, 705, 706) may be connected via one or more of the power lines (711, 712, 713, 714, 715, 716, 717). Steady-state current injection model 700 may comprise one or more generators (721, 722, 723). Each of the generators (721, 722, 723) may be associated with a current injection. Steady-state current injection model 700 may comprise one or more lead lines (741, 742, 743). Each of the lead lines (741, 742, 743) may be attached to one of the generators (721, 722, 723).

FIG. 8A illustrates an example equation 800 for an example profit objective function, as employed in various embodiments.

FIG. 8B illustrates example equations 801 for example network flow constraints for generators and demand buses, as employed in various embodiments. A G is the line to generator incidence matrix and A D is the line to bus incidence matrix.

FIG. 8C illustrates example equations 802 for example network flow constraints for lead lines and power lines, as employed in various embodiments. G and B are the nodal conductance and susceptance matrices respectively. Equations 801 and 802 may be employed to describe a steady-state current-injection model.

FIG. 9A illustrates an example expression 900 of an example reference voltage constraint, as employed in various embodiments. The reference voltage constraint may be set to equal zero. The reference voltage constraint may be separable with respect to generators and demand buses.

FIG. 9B illustrates example equations 901 for example generator capacity constraints, as employed in various embodiments. The generator capacity constraints may be set to be less than or equal to zero. The generator capacity constraints may be separable with respect to generators and demand buses.

FIG. 9C illustrates an example equation 902 for example thermal line flow constraints, as employed in various embodiments. The thermal line flow constraints may be set to be less than or equal to zero. The thermal line flow constraints may be separable with respect to generators and demand buses.

FIG. 9D illustrates example equations (903, 904) for example voltage magnitude constraints, as employed in various embodiments. The voltage magnitude constraints may be set to be less than or equal to zero. The voltage magnitude constraints may be separable with respect to generators and demand buses.

FIG. 9E illustrates example equations 905 for example power factor constraints, as employed in various embodiments. $\theta_{VD}$ is the demand bus voltage phase angle, $\theta^{max}_{VD}$ may equal $18.19\% + \theta^{min}_{VD} = -18.19\% + \theta_{ID}$. The power factor constraints may be set to be less than or equal to zero. If a reference bus is selected to have the largest voltage phase angle, then $\theta^{max}_{VD}$ may equal zero. The power factor constraints may be separable with respect to generators and demand buses.

FIG. 9F illustrates example equations 906 for an example voltage stability constraint, as employed in various embodiments. The voltage stability constraint may be set to be less than or equal to zero. The voltage stability constraint may be separable with respect to generators and demand buses.

FIG. 9G illustrates an example equation 907 for an example relaxation of an example lower bound for an example voltage magnitude constraint, as employed in various embodiments. Equation 907 may represent a set of separable secant lines. The relaxation of the lower bound for the voltage magnitude constraint may be set to be less than or equal to zero. The relaxation of the lower bound for the voltage magnitude constraint may be separable with respect to generators and demand buses.

FIG. 10 illustrates an example Newton-Raphson algorithm 1000, as employed in various embodiments.

For example, determining setpoints using the topology of steady-state current injection model 700, impedance values for this example may be as follows:

Power Line 711: $Z_{711} = 0.035 + j0.225$
Power Line 712: $Z_{712} = 0.000 + j0.035$
Power Line 713: $Z_{713} = 0.000 + j0.042$
Power Line 714: $Z_{714} = 0.028 + j0.125$
Power Line 715: $Z_{715} = 0.025 + j0.105$
Power Line 716: $Z_{716} = 0.026 + j0.175$
Power Line 717: $Z_{717} = 0.035 + j0.215$
Lead Line 741: $Z_{741} = j0.20$
Lead Line 742: $Z_{742} = j0.15$
Lead Line 743: $Z_{743} = j0.25$ Current withdrawals for this example may be as follows:
$I_{704} = 4.0 + j1.0$
$I_{705} = 2.5 + j1.0$
$I_{706} = 2.5 + j0.5$ Minimum and maximum limits on generator current injections for this example may be as follows:

Generator 721: $I_{RMax} = 2.95$, $I_{RMin} = 1.18$, $I_{IMax} = -0.10$, $I_{IMin} = -1.00$
Generator 722: $I_{RMax} = 3.35$, $I_{RMin} = 1.34$, $I_{IMax} = -0.10$, $I_{IMin} = -1.00$
Generator 723: $I_{RMax} = 2.05$, $I_{RMin} = 0.82$, $I_{IMax} = -0.10$, $I_{IMin} = -1.00$ For this example, all bus voltage magnitudes may have a lower bound of 0.9 and an upper bound of 1.1. The voltage stability constraint may limit the angle associated with the current injected to a lead line and/or power line in this example between ±20 degrees. A minimum power factor of 0.95 may be used in this example to calculate the lower limit on the demand bus voltage phase angle. The reference bus in this example may have the largest voltage phase angle. Therefore $\theta^{max}_{VD} = 0$. Marginal costs in $/MW for each generator and marginal revenue values for each demand bus for this example may be as follows:

| Generator | $\alpha_{Zg}$ | $\beta_{Zg}$ | $\gamma_g$ |
|---|---|---|---|
| 721 | 0.2 | 2 | 10 |
| 722 | 0.1125 | 1.5 | 10 |
| 723 | 0.3125 | 2.5 | 10 |

| Demand Bus | $\rho_{Rd}$ | $\beta_{Rd}$ | $\gamma_{Rd}$ | $\rho_{Id}$ | $\beta_{Id}$ | $\gamma_{Id}$ |
|---|---|---|---|---|---|---|
| 701 | 0.25 | 22 | 130 | 0.025 | 2.2 | 13 |
| 702 | 0.30 | 23 | 130 | 0.030 | 2.3 | 13 |
| 703 | 0.26 | 25 | 130 | 0.026 | 2.5 | 13 |
| 704 | 0.28 | 30 | 130 | 0.028 | 3.0 | 13 |
| 705 | 0.20 | 21 | 130 | 0.020 | 2.1 | 13 |
| 706 | 0.29 | 19 | 130 | 0.029 | 1.9 | 13 |

Therefore, using disclosed embodiments, equation 800 in this example may result in $763.79. The Generator voltage magnitude constraints are all=1.1. Additional associated decision variables for this example may be as follows:

Generator 721: $V_G=0.990+j0.479$, $I_G=2.39-j0.1$, voltage phase angle=25.8 degrees, generator capacity constraint=2.40, current phase angle=−2.39 degrees Generator 722: $V_G=1.05+j0.330$, $I_G=2.63-j0.563$, voltage phase angle=17.5 degrees, generator capacity constraint=2.69, current phase angle=−12.1 degrees Generator 723: $V_G=1.73+j0.422$, $I_G=1.73-j0.237$, voltage phase angle=25.6 degrees, generator capacity constraint=1.74, current phase angle=−7.8 degrees Demand Bus 701: $V_D=0.970+j0$, voltage magnitude constraint=0.970, voltage phase angle=0 degrees Demand Bus 702: $V_D=0.965+j0.064$, voltage magnitude constraint=0.967, voltage phase angle=−3.8 degrees Demand Bus 703: $V_D=0.957+j0.009$, voltage magnitude constraint=0.957, voltage phase angle=−0.57 degrees Demand Bus 704: $V_D=0.945+j0.156$, voltage magnitude constraint=0.958, voltage phase angle=−9.38 degrees Demand Bus 705: $V_D=0.947+j0.082$, voltage magnitude constraint=0.950, voltage phase angle=−4.95 degrees Demand Bus 706: $V_D=0.921+j0.193$, voltage magnitude constraint=0.941, voltage phase angle=−11.8 degrees Power Line 711: $I_L=0.695+j0.004$, thermal line flow constraint=0.695, current phase angle=0.337 degrees Power Line 712: $I_L=2.63+j0.563$, thermal line flow constraint=2.69, current phase angle=−12.1 degrees Power Line 713: $I_L=1.73+j0.237$, thermal line flow constraint=1.74, current phase angle=−7.798 degrees Power Line 714: $I_L=0.323+j0.118$, thermal line flow constraint=0.344, current phase angle=−20.0 degrees Power Line 715: $I_L=0.790+j0.037$, thermal line flow constraint=0.791, current phase angle=−2.71 degrees Power Line 716: $I_L=0.643+j0.0.49$, thermal line flow constraint=0.644, current phase angle=−4.3582 degrees Power Line 717: $I_L=0.910+j0.059$, thermal line flow constraint=0.911, current phase angle=−3.68 degrees Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". In this specification, the term "may" is to be interpreted as "may, for example." In other words, the term "may" is indicative that the phrase following the term "may" is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element), or a combination thereof, all of which are behaviorally equivalent. For example, modules may be implemented using computer hardware in combination with software routine(s) written in a computer language (e.g., Java, HTML, XML, PHP, Python, ActionScript, JavaScript, Ruby, Prolog, SQL, VBScript, Visual Basic, Perl, C, C++, Objective-C, or the like). Additionally, it may be possible to implement modules using physical hardware that incorporates discrete or programmable analog, digital, and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++, or the like. FPGAs, ASICs, and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines, and/or the like. The processing hardware may be configured to execute instructions. The instructions may be stored on a machine-readable medium. According to some embodiments, the machine-readable medium (e.g. automated data medium) may be a medium being configured to store data in a machine-readable format that may be accessed by an automated sensing device. Examples of machine-readable media include: flash memory, memory cards, electrically erasable programmable read-only memory (EEPROM), solid state drives, optical disks, barcodes, magnetic ink characters, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. In particular, it should be noted that, for example purposes, an automated control system has been described as comprised one or more processors and one or more memory devices. However, one skilled in the art will recognize that a control system may be collective based: portable equipment, broadcast equipment, virtual, application(s) distributed over a broad combination of computing sources, part of a cloud, and/or the like. Similarly, for example, one or more power system resources may comprise a user based client, portable equipment, broadcast equipment, virtual, application(s) distributed over a broad combination of computing sources, part of a cloud, and/or the like. Additionally, it should be noted that, for example purposes, several of the various embodiments are described as instructions. However, one skilled in the art will recognize that many various languages and frameworks may be employed to build and use embodiments of the present invention.

In this specification, various embodiments are disclosed. Limitations, features, and/or elements from the disclosed example embodiments may be combined to create further embodiments within the scope of the disclosure. Moreover, the scope includes any and all embodiments having equivalent elements, modifications, omissions, adaptations, or alterations based on the present disclosure. Further, aspects of the disclosed methods can be modified in any manner, including by reordering aspects, or inserting or deleting aspects.

In addition, it should be understood that any figures that highlight any functionality and/or advantages, are presented for example purposes only. The disclosed architecture is sufficiently flexible and configurable, such that it may be utilized in ways other than that shown. For example, the blocks presented in any flowchart may be re-ordered or only optionally used in some embodiments.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features, or with all three of the three possible features.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. An automated control system comprising:
 a) at least one memory storing instructions; and
 b) at least one processor being configured to execute the instructions to perform operations, the operations comprising:
  i) automatically determining a current withdrawal phase angle for each of a plurality of demand buses in a steady-state current injection model, the current withdrawal phase angle based on a current withdrawal for each of the demand busses;
  ii) automatically determining a power factor constraint for each of the demand busses, the power factor constraint based on a demand bus voltage phase angle and the current withdrawal phase angle;
  iii) automatically determining a set of demand bus voltage magnitude constraints for each of the demand buses, each set of demand bus voltage magnitude constraints based on a demand bus voltage vector, the demand bus voltage phase angle, and the power factor constraint;
  iv) automatically determining a set of generator voltage magnitude constraints for each of a plurality of generators in the steady-state current injection model, each set of generator voltage magnitude constraints based on a generator voltage vector;
  v) automatically determining network flow constraints in the steady-state current injection model, the network flow constraints based on the current withdrawal for each of the demand busses, a current injection from each of the generators, and a current vector for each of a plurality of power lines in the steady-state current injection model;
  vi) automatically determining a set of generator capacity constraints for each of the generators, each set of generator capacity constraints based on a maximum stator current, a maximum rotor current, a minimum safe operating level, and a generator impedance;
  vii) automatically partitioning a power line from each of the generators as one of a plurality of lead lines;
  viii) automatically determining thermal line flow constraints based on a power line impedance vector for each of the power lines;
  ix) automatically determining minimum and maximum demand bus voltage phase angle differences between connected demand buses in the steady-state current injection model, the minimum and maximum demand bus voltage phase angle differences based on the demand bus voltage phase angle for each of the connected demand buses;
  x) automatically determining minimum and maximum generator voltage phase angle differences between the generators in the steady-state current injection model, the minimum and maximum generator voltage phase angle differences based on a generator voltage phase angle for each of the generators;
  xi) automatically determining nodal voltage phase angle vectors between the generators and the demand buses in the steady-state current injection model, each of the nodal voltage phase angle vectors based on the demand bus voltage phase angle, and the generator voltage phase angle;

xii) automatically determining voltage stability constraints for the lead lines and power lines, the voltage stability constraints based on the minimum and maximum voltage phase angle differences between the nodes at either end of a lead line or power line;
xiii) automatically determining a reference voltage constraint for the steady-state current injection model, the reference voltage constraint based on a reference voltage angle;
xiv) automatically determining a linear marginal cost curve for each of the generators, each linear marginal cost curve based on the generator voltage vector, the current injection, and generator cost terms of an active and reactive power injection;
xv) automatically determining a linear marginal revenue curve for each of the demand buses, each linear marginal revenue curve based on the demand bus voltage vector, the current withdrawal, and demand bus revenue terms of an active and reactive power withdrawal;
xvi) automatically determining a retail rate for each of the lead lines and each of the power lines;
xvii) automatically minimizing a profit objective function through employment of a Lagrangian function, Karush-Kuhn-Tucker (KKT) conditions, and a Newton-Raphson algorithm, the profit objective function based on at least the following:
  1. The demand bus voltage vector for each of the demand buses;
  2. The current withdrawal for one or more of the demand buses;
  3. The current injection from each of the generators;
  4. The generator capacity constraints for each of the generators;
  5. The linear marginal cost curve for each of the generators;
  6. The linear marginal revenue curve for each of the demand buses;
  7. The retail rate for each of the lead lines and each of the power lines; and
  8. A complex power loss in each of the lead lines; and
xviii) automatically determining setpoints for a plurality of electric power system resources, the setpoints based on at least the following:
  1. A minimum output of the profit objective function;
  2. The generator voltage vector for each of the generators;
  3. The power factor constraint for each of the demand busses;
  4. The demand bus voltage magnitude constraints for each of the demand buses;
  5. The generator voltage magnitude constraints for each of the generators;
  6. The network flow constraints;
  7. The thermal line flow constraints;
  8. The voltage stability constraints for the lead lines and the power lines; and
  9. The reference voltage constraint;
xviii) controlling, one or more of the plurality of electric power system resources, using the setpoints.

2. The automated control system of claim 1, wherein the generator cost terms comprise quadratic, linear, and fixed cost terms.

3. The automated control system of claim 1, wherein the generator cost terms comprise costs for active and reactive power generation.

4. The automated control system of claim 1, wherein the demand bus revenue terms comprise quadratic, linear, and fixed revenue terms.

5. The automated control system of claim 1, wherein the demand bus revenue terms comprise revenues from active and reactive power consumption.

6. The automated control system of claim 1, wherein the profit objective function is convex.

7. The automated control system of claim 1, the operations further comprising automatically receiving data from one or more electrical power systems, the data including at least one of the following:
  a) the demand bus voltage vector for one or more of the demand buses;
  b) the demand bus voltage phase angle for one or more of the demand buses;
  c) the current withdrawal for one or more of the demand buses;
  d) the generator voltage vector for one or more of the generators;
  e) the generator voltage phase angle for one or more of the generators;
  f) the current injection from one or more of the generators;
  g) the maximum stator current for one or more of the generators;
  h) the maximum rotor current for one or more of the generators;
  i) the minimum safe operating level for one or more of the generators;
  j) the generator impedance for one or more of the generators;
  k) the current vector for one or more of the power lines;
  l) The power line impedance vector for one or more of the power lines;
  m) the retail rate for one or more of the lead lines;
  n) the retail rate for one or more of the power lines;
  o) the reference voltage angle for the steady-state current injection model;
  p) the generator cost terms of the active and reactive power injection for one or more of the generators;
  q) the demand bus revenue terms of the active and reactive power withdrawal at one or more of the demand buses; or
  r) the complex power loss in one or more of the lead lines.

8. The automated control system of claim 1, the operations further comprising automatically retrieving data from one or more data storage devices, the data including at least one of the following:
  a) the demand bus voltage vector for one or more of the demand buses;
  b) the demand bus voltage phase angle for one or more of the demand buses;
  c) the current withdrawal for one or more of the demand buses;
  d) the generator voltage vector for one or more of the generators;
  e) the generator voltage phase angle for one or more of the generators;
  f) the current injection from one or more of the generators;
  g) the maximum stator current for one or more of the generators;
  h) the maximum rotor current for one or more of the generators;
  i) the minimum safe operating level for one or more of the generators;
  j) the generator impedance for one or more of the generators;

k) the current vector for one or more of the power lines;
l) The power line impedance vector for one or more of the power lines;
m) the retail rate for one or more of the lead lines;
n) the retail rate for one or more of the power lines;
o) the reference voltage angle for the steady-state current injection model;
p) the generator cost terms of the active and reactive power injection for one or more of the generators;
q) the demand bus revenue terms of the active and reactive power withdrawal at one or more of the demand buses; or
r) the complex power loss in one or more of the lead lines.

9. The automated control system of claim 1, the operations further comprising automatically communicating the setpoints to one or more users of the automated control system.

10. The automated control system of claim 1, the operations further comprising automatically communicating the setpoints to the electric power system resources.

11. The automated control system of claim 1, the operations further comprising automatically communicating the setpoints to one or more operators of the electric power system resources.

12. A method comprising:
a) determining a current withdrawal phase angle for each of a plurality of demand buses in a steady-state current injection model, the current withdrawal phase angle based on a current withdrawal for each of the demand busses;
b) determining a power factor constraint for each of the demand busses, the power factor constraint based on a demand bus voltage phase angle and the current withdrawal phase angle;
c) determining a set of demand bus voltage magnitude constraints for each of the demand buses, each set of demand bus voltage magnitude constraints based on a demand bus voltage vector, the demand bus voltage phase angle, and the power factor constraint;
d) determining a set of generator voltage magnitude constraints for each of a plurality of generators in the steady-state current injection model, each set of generator voltage magnitude constraints based on a generator voltage vector;
e) determining network flow constraints in the steady-state current injection model, the network flow constraints based on the current withdrawal for each of the demand busses, a current injection from each of the generators, and a current vector for each of a plurality of power lines in the steady-state current injection model;
f) determining a set of generator capacity constraints for each of the generators, each set of generator capacity constraints based on a maximum stator current, a maximum rotor current, a minimum safe operating level, and a generator impedance;
g) partitioning a power line from each of the generators as one of a plurality of lead lines;
h) determining thermal line flow constraints based on a power line impedance vector for each of the power lines;
i) determining minimum and maximum demand bus voltage phase angle differences between connected demand buses in the steady-state current injection model, the minimum and maximum demand bus voltage phase angle differences based on the demand bus voltage phase angle for each of the connected demand buses;
j) determining minimum and maximum generator voltage phase angle differences between the generators in the steady-state current injection model, the minimum and maximum generator voltage phase angle differences based on a generator voltage phase angle for each of the generators;
k) determining nodal voltage phase angle vectors between the generators and the demand buses in the steady-state current injection model, each of the nodal voltage phase angle vectors based on the demand bus voltage phase angle, and the generator voltage phase angle;
l) Determining voltage stability constraints for the lead lines and power lines, the voltage stability constraints based on the minimum and maximum voltage phase angle differences between the nodes at either end of a lead line or power line;
m) determining a reference voltage constraint for the steady-state current injection model, the reference voltage constraint based on a reference voltage angle;
n) determining a linear marginal cost curve for each of the generators, each linear marginal cost curve based on the generator voltage vector, the current injection, and generator cost terms of an active and reactive power injection;
o) determining a linear marginal revenue curve for each of the demand buses, each linear marginal revenue curve based on the demand bus voltage vector, the current withdrawal, and demand bus revenue terms of an active and reactive power withdrawal;
p) determining a retail rate for each of the lead lines and each of the power lines;
q) minimizing a profit objective function through employment of a Lagrangian function, Karush-Kuhn-Tucker (KKT) conditions, and a Newton-Raphson algorithm, the profit objective function based on at least the following:
  i) the demand bus voltage vector for each of the demand buses;
  ii) the current withdrawal for one or more of the demand buses;
  iii) the current injection from each of the generators;
  iv) the generator capacity constraints for each of the generators;
  v) the linear marginal cost curve for each of the generators;
  vi) the linear marginal revenue curve for each of the demand buses;
  vii) the retail rate for each of the lead lines and each of the power lines; and
  viii) a complex power loss in each of the lead lines; and
r) determining setpoints for a plurality of electric power system resources, the setpoints based on at least the following:
  i) a minimum output of the profit objective function;
  ii) the generator voltage vector for each of the generators;
  iii) the power factor constraint for each of the demand busses;
  iv) the demand bus voltage magnitude constraints for each of the demand buses;
  v) the generator voltage magnitude constraints for each of the generators;
  vi) the network flow constraints;
  vii) the thermal line flow constraints;
  viii) the voltage stability constraints for the lead lines and the power lines; and
  ix) the reference voltage constraint;

s) controlling, one or more of the plurality of electric power system resources, using the setpoints.

13. The method of claim 12, further comprising receiving data from one or more electrical power systems, the data including at least one of the following:
   a) the demand bus voltage vector for one or more of the demand buses;
   b) the demand bus voltage phase angle for one or more of the demand buses;
   c) the current withdrawal for one or more of the demand buses;
   d) the generator voltage vector for one or more of the generators;
   e) the generator voltage phase angle for one or more of the generators;
   f) the current injection from one or more of the generators;
   g) the maximum stator current for one or more of the generators;
   h) the maximum rotor current for one or more of the generators;
   i) the minimum safe operating level for one or more of the generators;
   j) the generator impedance for one or more of the generators;
   k) the current vector for one or more of the power lines;
   l) The power line impedance vector for one or more of the power lines;
   m) the retail rate for one or more of the lead lines;
   n) the retail rate for one or more of the power lines;
   o) the reference voltage angle for the steady-state current injection model;
   p) the generator cost terms of the active and reactive power injection for one or more of the generators;
   q) the demand bus revenue terms of the active and reactive power withdrawal at one or more of the demand buses; or
   r) the complex power loss in one or more of the lead lines.

14. The method of claim 12, further comprising retrieving data from one or more data storage devices, the data including at least one of the following:
   a) the demand bus voltage vector for one or more of the demand buses;
   b) the demand bus voltage phase angle for one or more of the demand buses;
   c) the current withdrawal for one or more of the demand buses;
   d) the generator voltage vector for one or more of the generators;
   e) the generator voltage phase angle for one or more of the generators;
   f) the current injection from one or more of the generators;
   g) the maximum stator current for one or more of the generators;
   h) the maximum rotor current for one or more of the generators;
   i) the minimum safe operating level for one or more of the generators;
   j) the generator impedance for one or more of the generators;
   k) the current vector for one or more of the power lines;
   l) The power line impedance vector for one or more of the power lines;
   m) the retail rate for one or more of the lead lines;
   n) the retail rate for one or more of the power lines;
   o) the reference voltage angle for the steady-state current injection model;
   p) the generator cost terms of the active and reactive power injection for one or more of the generators;
   q) the demand bus revenue terms of the active and reactive power withdrawal at one or more of the demand buses; or
   r) the complex power loss in one or more of the lead lines.

15. The method of claim 12, further comprising communicating the setpoints to one or more users of an automated control system.

16. The method of claim 12, further comprising communicating the setpoints to one or more of the plurality of electric power system resources.

* * * * *